United States Patent
Beaudou et al.

(10) Patent No.: US 8,031,871 B2
(45) Date of Patent: Oct. 4, 2011

(54) METHOD OF UPDATING AN AUTHENTICATION ALGORITHM IN A COMPUTER SYSTEM

(75) Inventors: Patrice Beaudou, Montrouge (FR); Christophe Dubois, Poissy (FR)

(73) Assignee: Gemalto SA, Meudon (FR)

( * ) Notice: Subject to any disclaimer, the term of this patent is extended or adjusted under 35 U.S.C. 154(b) by 1285 days.

(21) Appl. No.: 10/507,291

(22) PCT Filed: Mar. 11, 2003

(86) PCT No.: PCT/IB03/00868
§ 371 (c)(1),
(2), (4) Date: Apr. 8, 2005

(87) PCT Pub. No.: WO03/077586
PCT Pub. Date: Sep. 18, 2003

(65) Prior Publication Data
US 2005/0182802 A1 Aug. 18, 2005

(30) Foreign Application Priority Data

Mar. 11, 2002 (EP) ..................................... 02075996
Jun. 7, 2002 (FR) ..................................... 02 07168

(51) Int. Cl.
*G06F 21/00* (2006.01)
*H04M 1/66* (2006.01)

(52) U.S. Cl. ........................................ 380/247; 455/411
(58) Field of Classification Search ................. 380/247
See application file for complete search history.

(56) References Cited

U.S. PATENT DOCUMENTS

| 5,615,267 | A  | * | 3/1997 | Lin et al. ....................... 380/248 |
| 6,603,968 | B2 | * | 8/2003 | Anvekar et al. ................ 455/433 |
| 6,907,123 | B1 | * | 6/2005 | Schier ............................ 380/28 |
| 2001/0005683 | A1 | | 6/2001 | Dion et al. |
| 2004/0176092 | A1 | * | 9/2004 | Heutschi .................... 455/435.1 |

FOREIGN PATENT DOCUMENTS

| EP | 0977451 A2 | 2/2000 |
| EP | 1083767 A2 | 3/2001 |

* cited by examiner

*Primary Examiner* — Gilberto Barron, Jr.
*Assistant Examiner* — Devin Almeida
(74) *Attorney, Agent, or Firm* — Pehr B. Jansson; The Jansson Firm

(57) ABSTRACT

The invention relates to a method of updating an authentication algorithm in at least one data processing device (CARD, SERV) which can store a subscriber identity (IMSI1) which is associated with an authentication algorithm (Algo1) in a memory element of said device (CARD, SERV). The inventive method comprises the following steps, namely: a step whereby a second inactive (Algo2) authentication algorithm is pre-stored in a memory element of the device and a step for switching from the first algorithm (Algo1) to the second algorithm (Algo2) which can inhibit the first algorithm (Algo1) and activate the second (Algo2).

12 Claims, 2 Drawing Sheets

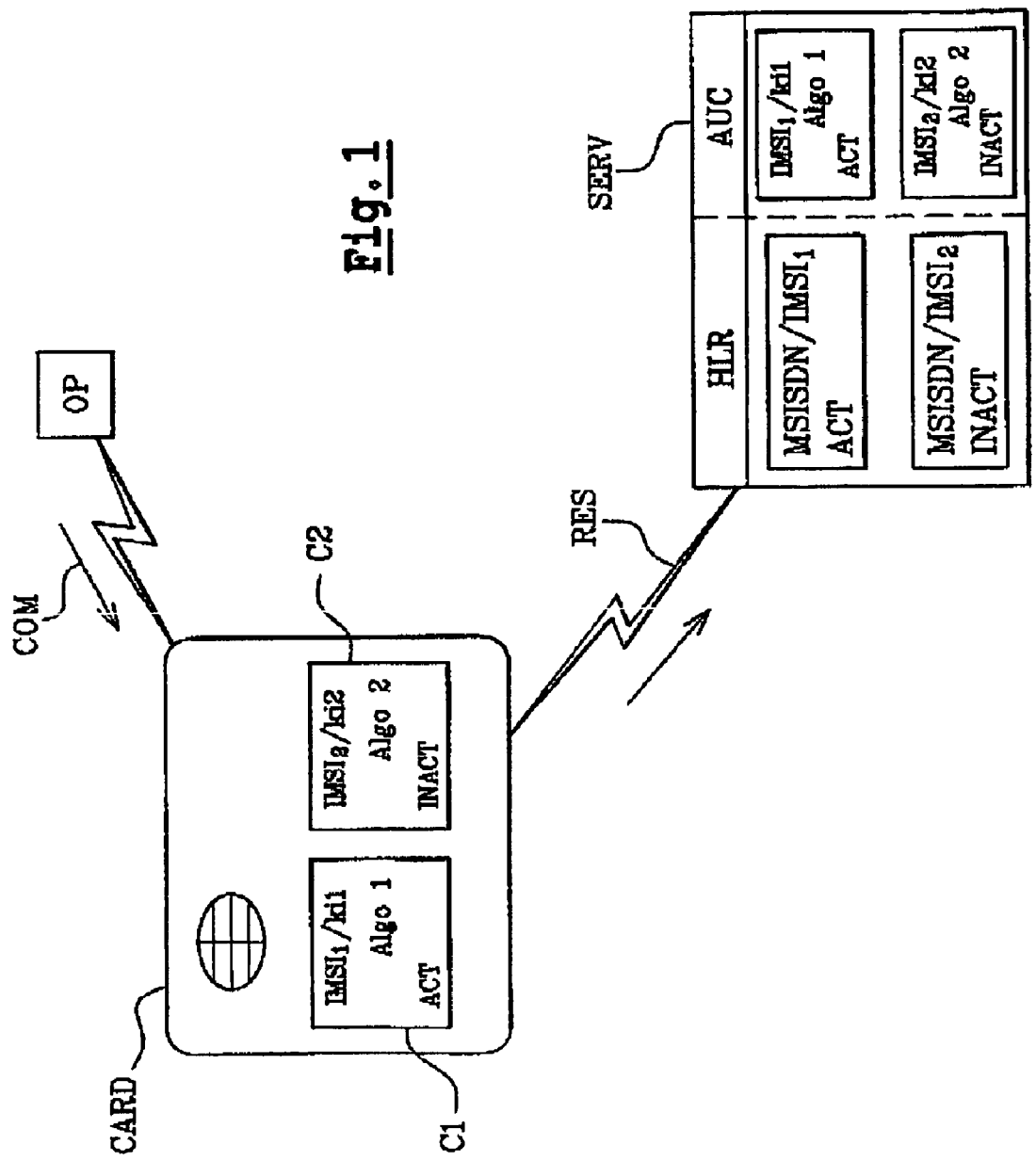

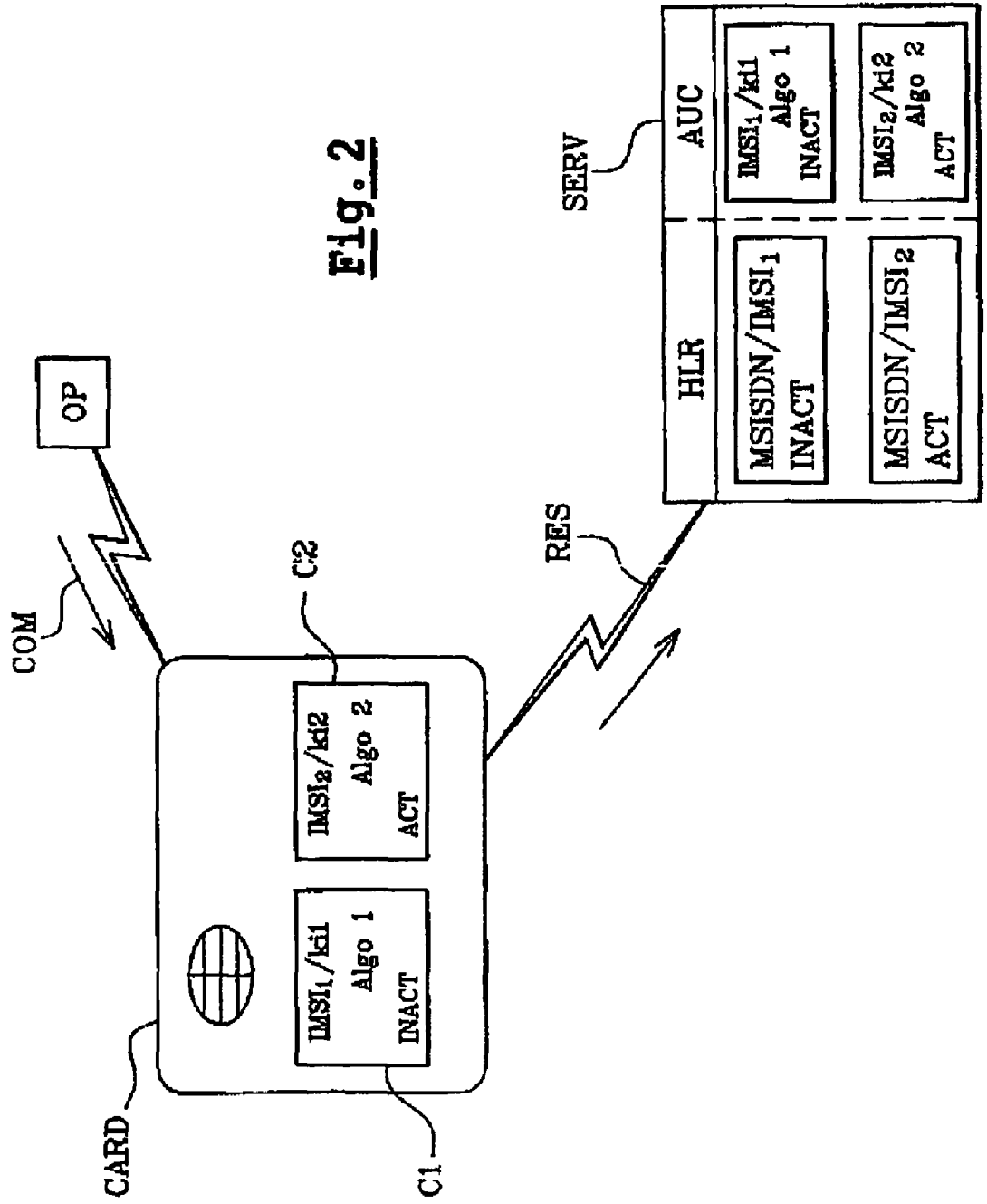

METHOD OF UPDATING AN AUTHENTICATION ALGORITHM IN A COMPUTER SYSTEM

BACKGROUND OF THE INVENTION

1. Field of the Invention

This invention relates to a method of updating an authentication algorithm in a computer system.

The invention applies to any data processing device storing an authentication algorithm. The invention applies more especially to a smart card.

The smart card can be coupled with any system, embedded or not.

The invention can be implemented in any type of telecommunication network such as GSM (Global System for Mobile communication), UMTS (Universal Mobile Telecommunication Service), GPRS (General Packet Radio Service), etc.

The example chosen to illustrate the invention will be that of the mobile telephone coupled with a SIM (Subscriber Identity Module) smart card.

2. Description of the Related Art

In order to manage a user roaming in a GSM (Global System for Mobile Communication) network, this user must be specifically identified.

Since a radio channel is used, the communications are vulnerable to eavesdropping and fraudulent use. The GSM system therefore:

- authenticates each user (or subscriber) before allowing access to a service,
- uses a temporary identity,
- encrypts the communications.

The GSM system currently uses four types of code associated with the subscriber:

- The IMSI (International Mobile Subscriber Identity) code. This identity is written in the SIM card;
- The TMSI (Temporary Mobile Subscriber Identity) code is a temporary identity allocated by the network to a mobile telephone, then used for the transactions on radio channel;
- The MSISDN code is the Mobile Station International ISDN Number in compliance with the ITU (International Telecommunications Union) numbering plan E164, and known by the subscriber;
- The MSRN (Mobile Station Roaming Number) code is a number allocated temporarily, using a regular telephone number that routes the call to an MSC where the roaming subscriber is currently located.

During the subscription, a key Ki is allocated to the subscriber with the IMSI code. This pair IMSI/Ki is stored both in the subscriber's SIM card and outside the card, in particular in an authentication centre AuC. A pair is closely linked to one or more authentication algorithms.

Note that the authentication centre AuC is used to authenticate subscribers of a GSM network. For information, note that authentication enables the network to check that a subscriber is authorised to use the network by checking the presence of a secret key in the SIM card.

Another pair may also be stored in a second database known as the HLR (Home Location Register). This database stores the pair MSISDN/IMSI associated with each subscriber, consisting of the subscriber's MSISDN and the invariant IMSI.

A problem arises when updating an algorithm stored in the card, and in any data processing device storing data specific to users (the authentication centre AuC, the home location register HLR, the visitor location register VLR database, etc.) communicating with the card. Updating involves, amongst other things, modifying the algorithm used to authenticate each pair IMSI/Ki and the pairs MSISDN/Ki, both in the card and outside the card in the AuC, the VLR, the HLR, etc.

One simplistic solution could consist in downloading the new algorithm into the card and outside the card in the AuC, the VLR, the HLR, etc. This solution poses a problem in terms of security, however; it is out of the question to consider sending this algorithm on the network, especially since this algorithm is non proprietary.

SUMMARY OF THE INVENTION

One objective is the secured update of an authentication algorithm.

In order to achieve this objective, the invention relates to a method of updating an authentication algorithm in at least one data processing device which can store a subscriber identity which is associated with an authentication algorithm in a memory element of said device, characterised in that it comprises the following steps:

- A preliminary step whereby a second inactive authentication algorithm is stored in a memory element of the device,
- A step for switching from the first algorithm to the second algorithm (Algo2), which can inhibit the first algorithm and activate the second.

We can therefore see that the authentication algorithms are pre-stored in the card. During the update, this avoids transmitting an authentication algorithm to perform an update.

It will be easier to understand the invention on reading the description below, given as an example and referring to the attached drawings.

BRIEF DESCRIPTION OF THE DRAWINGS

FIG. 1 is a view of a computer system to which the invention can be applied. This figure shows the state of the computer system before switching accounts.

FIG. 2 represents the same view as FIG. 1. On this figure, the state of the system is that obtained after switching accounts.

DESCRIPTION OF THE INVENTION

To simplify the description, the same elements concern the same references.

To illustrate the invention, FIG. 1 shows an architecture comprising an embedded system such as a mobile telephone (not shown) coupled with a card CARD. In our example of realisation, a SIM card is used.

In our example illustrated, the embedded system communicates with a data processing device such as a server SERV via a telecommunication network RES.

In our example, an operator OP manages the various cards distributed over the network. In particular, the operator manages the accounts of the various subscribers. Generally, during the card personalisation, the operator allocates a pair of data items, i.e. the key Ki and the IMSI code associated with at least one authentication algorithm, and loads them into the card. The card therefore stores a pair IMSI/Ki for each subscriber. This pair is also stored in an authentication centre AuC.

In order to simplify the illustration of the invention, it was decided to associate a unique authentication algorithm with each account. This example is not limiting however: several authentication algorithms could have been associated with the same subscriber account.

In our example illustrated, another pair MSISDN/IMSI is stored in the HLR (Home Location Register) database.

The AuC and the HLR may either be on the same server or on two different servers. In our example and in reference to FIG. 1, it was decided to store them on the same server SERV.

As we have seen above, updating an authentication algorithm is not easy.

In our example of realisation, the update method according to the invention requires a smart card which can store at least two accounts C1 and C2. The card stores a first subscriber account C1 associated with at least one first authentication algorithm Algo1 (A3A8). This first account consists of the pair IMSI1/Ki1. In our example illustrated, the card also stores a second account C2 associated with the same subscriber A1 associated with at least one second authentication algorithm Algo2(A3A8). This second account consists of the pair IMSI2/Ki2. The invention is not limited to the authentication algorithm A3A8 known by those skilled in the art but can be applied to any type of authentication algorithm.

In the remainder of the description, each account C1 and C2 will be identified by its respective code IMSI1 and IMSI2.

In our example of realisation, the accounts IMSI1 and IMSI2 are managed by the same operator OP. According to another mode of realisation, the accounts on the card may be managed by different operators.

Similarly, in our example, the authentication centre AuC stores the account IMSI1 associated with the first algorithm Algo1(A3A8) and the account IMSI2 associated with the second algorithm Algo2(A3A8).

Similarly, in our example, the HLR database stores the pair MSISDN/IMSI1 associated with the first account and the pair MSISDN/IMSI2 associated with the second account.

The method of updating consists in switching the first account IMSI1 to the second IMSI2 in the smart card, and if necessary in the server SERV. In the example of realisation, the server SERV is equipped with a feature which can store two accounts per subscriber.

To do this, before switching, the account IMSI1 is active whereas the account IMSI2 is inactive. FIG. 1 is a view of the system before switching accounts. FIG. 2 is a view of the system after switching.

In our example of realisation, the account switching steps are as follows:

Step 1

The operator executes a command to switch accounts. Advantageously, this is an OTA (Over The Air) command which can set a flag on the card, the result of activation being to switch from one account to another.

A flag may simply consist of setting a bit. For example, a bit in state 0 means that account IMSI1 is inactive and that account IMSI2 is active. Inversely, a bit in state 1 means that account IMSI1 is active and that account IMSI2 is inactive.

Step 2

The card CARD receives the command and switches account, from account IMSI1 to account IMSI2. At this moment, in the card, the first account IMSI1 switches from active to inactive state and the second account IMSI2 switches from inactive to active state.

Step 3

In our example, in order to synchronise the change of state of the accounts stored in the card with those stored in the server SERV, the telephone with the card transmits an authentication command to the server so that it switches accounts. This authentication command includes the new code IMSI2.

In the server, the active account is account IMSI1. When the server receives the authentication command, a program can identify the new code IMSI2. The server SERV then switches algorithm in order to synchronise the update of the authentication algorithms with the card CARD.

In the server, all pairs (MSISDN/IMSI1 and IMSI1/Ki1) associated with the first algorithm Algo1(A3A8) become inactive, whereas all pairs (MSISDN/IMSI2 and IMSI2/Ki2) associated with the new algorithm Algo2(A3A8) become active. As on the card, switching can be carried out by setting a flag.

Step 4

At this stage of the method, the two accounts IMSI1 and IMSI2 have switched both in the card CARD and in the server SERV; the authentication algorithm used for authentication both in the card CARD and in the server SERV is now the new algorithm Algo2(A3A8).

The steps described above correspond to a special, non limiting example of realisation. Step 3 could be implemented differently:

For example, it is not necessary to create two accounts IMSI1 and IMSI2. The card can store a single account and two authentication algorithms Algo1 and Algo2. The operator can quite simply transmit simultaneously a command to the card and to the server to switch from the first algorithm Algo1 to the second algorithm Algo2 in the card and on the server; advantageously, different keys Ki can be planned for each algorithm Algo1 and Algo2.

Or, the operator may transmit a command to the server only. On the card, the active account is still IMSI1. Later, when the telephone with the card attempts to authenticate itself with the server SERV, the server receives the code IMSI1 associated with the first algorithm Algo1 and sees that the account currently used on the card is not IMSI2. The server therefore executes a command to switch accounts on the card. Once the switching has been carried out, the telephone with the card could be configured to transmit to the server a message indicating that switching has taken place. On reception of this message, the accounts switch from account IMSI1 to account IMSI2 on the server. After switching the accounts on the server SERV, the server then requests the card to authenticate itself with the new algorithm Algo2 associated with the new account IMSI2.

Or, the operator caring out the switching can download into the card, and possibly into the server, a program which can start up after a time delay, for example on a given date, whose purpose is to switch from one account to another.

Or, the operator can also delegate the switching operation to one or more intelligent agents capable of switching the accounts. For example, a set of cards could be assigned to each agent. In this example, the operator transmits a command to all or some of the agents so that they transmit to the card a command COM which has the same characteristics as described above.

Switching accounts on the server can be carried out differently. The card authenticates itself with the server using the new code IMSI2 associated with the new algorithm Algo2. However, the algorithm Algo2 used on the card is not the same as the algorithm active on the server SERV. Authentication therefore fails; this failure could trigger the switching of algorithms on the server.

In step 3, the switching cannot be carried out instantaneously. When the flag is set, the actual switching from one account to another could be configured to take place only on occurrence of an event such as card reset (Off/On), or on execution of the REFRESH command, using for example one of the following modes:

Reset,

Full File Change Notification or File Change Notification if the card contains a file EF(IMSI) including the new code IMSI.

For further details concerning these modes, refer to ETSI specifications TS 11.14, TS 31.111 and TS 102 223 known by those skilled in the art.

Note that updating an authentication algorithm modifies the pairs IMSI/Ki and MSISDN/IMSI. Modification does not always involve modifying both halves of a pair. Modification may only involve one half. For example, modifying an algorithm may concern only the IMSI half of the pair IMSI/Ki.

Generally, the invention relates to a method comprising the following steps:

a preliminary step whereby a second inactive authentication algorithm (Algo2) is stored in a memory element of the device, A step for switching from the first algorithm (Algo1) to the second algorithm (Algo2), which can inhibit the first algorithm (Algo1) and activate the second (Algo2).

Advantageously, the switching step is carried out on the initiative of an entity (OP) external to said device. In our example of realisation, this entity is an operator OP. In our example, the operator controls the switching operation.

In our example, the operator transmitting the switching command is an operator managing an active account on the card. Special arrangements could be planned, however, between operators to allow each other to switch accounts on the card; in this context, the operator transmitting the switching command could be the operator of an inactive account on the card. More generally, the switching step is initiated, preferably, by any person/entity authorised to do so.

Preferably, the algorithm storage step is carried out in a safe place, for example during card personalisation.

The switching mode can be implemented differently. For example, we have seen that the operator responsible for switching can download into the device a program which starts up after a time delay. Switching can therefore take place at the same time on the card and on any device concerned by an update of the authentication algorithm.

We have seen that there are various ways of synchronising the update of the authentication algorithms on the card and on the server. Advantageously, a second account C2 including a code IMSI2, different from the code IMSI1, associated with algorithm Algo2, is stored. After the account switching step on the device in question, the device transmits the code IMSI2 to all or some of the data processing devices whose algorithms need to be switched. The purpose of this code IMSI2 is in particular to inform the data processing devices whose algorithms need to be switched that a switch has taken place. This synchronises the update of the algorithms in the computer system. On reception of the code (IMSI2) associated with the second algorithm (Algo2), said receiving device switches algorithm from the first algorithm (Algo1) to the second algorithm (Algo2).

The synchronisation can be carried out differently. We have also seen in our example that, after switching, said device can quite simply transmit a command to another data processing device whose accounts need to be switched.

Advantageously, after switching, the memory space storing the data associated with the deactivated account is reused. For example, after switching, the data associated with the deactivated account is erased from the memory. This erasure thereby releases memory space.

We have also seen above that, during the first step, the two accounts IMSI1 and IMS12 created in the card belong to the same subscriber A1. Note that one subscriber may include a group of users using the same account.

We have also seen, in our example of realisation, that switching consists in first deactivating the first account IMSI1 and secondly activating the second account IMSI2.

The result is a data processing device, in particular a smart card, characterised in that it comprises:

memory means storing a second authentication algorithm (Algo2), and in that it comprises a microcontroller programmed to perform, on the initiative of an operator (OP) a step for switching from the first algorithm (Algo1) to the second algorithm (Algo2).

The invention also concerns a computer program for a data processing device, comprising code instructions to execute the switching step defined previously.

Lastly, the invention concerns a computer program for a data processing device, comprising code instructions to, after the step for switching from the first algorithm to the second, identify the algorithm used by a transmitting device with the code (IMSI2) received from said transmitting device.

We see that the invention offers numerous advantages:

This type of implementation saves a considerable amount of time. The card is in fact sold with two algorithms. A first algorithm for current use and a second algorithm for future use. The operator decides when to perform the migration. A simple command is sufficient to carry out switching on a determined number of smart cards. The operator can therefore, if required, carry out individual migration, i.e. card by card.

We have also seen that once switching has taken place and the new algorithm Algo2 is active, the account associated with the old algorithm Algo1 can be erased, thereby releasing memory space. This release of memory space, especially in the smart card, is a significant advantage in view of the extreme hardware constraints regarding memory size.

The invention avoids the need to replace all cards currently in use by new cards storing the new version of the authentication algorithm;

The invention avoids the need to assign a new telephone number to each subscriber whose pair IMSI/Ki has to be stored in a new authentication centre AuC; the user then keeps the same card and the same telephone number in all cases.

The invention offers the operator considerable cost savings. We can see that the invention is advantageous for the operator since it uses a single authentication centre to update the authentication algorithms. The operator is not obliged to purchase new equipment to perform the migration. Once again, the financial cost of this type of implementation is considerably reduced.

Although specific embodiments of the invention have been described and illustrated, the invention is not to be limited to the specific forms or arrangements of parts so descried and illustrated. The invention is limited only by the claims.

The invention claimed is:

1. Method of updating an authentication algorithm used by a device (CARD) to authenticate with a data processing device (SERV) wherein the device (CARD) has a memory element for storing a subscriber identity (IMSI) which is associated with an authentication algorithm, comprising:

a first preliminary step of storing an active first authentication algorithm (Algo1) in a non-volatile memory element of the device (CARD) associated with a first subscriber identity (IMSI1);

a second preliminary step of storing an inactive second inactive authentication algorithm (Algo2) in a non-volatile memory element of the device (CARD) associated with a second subscriber identity (IMS12); and a step for switching from the first authentication algorithm (Algo1) to the second authentication algorithm (Algo2) including inhibiting the first authentication algorithm (Algo1) and activate activating the second authentication algorithm (Algo2) used by the device (CARD).

2. Method according to claim 1, wherein the switching step is carried out on the initiative of an entity (OP) external to said device.

3. Method according to claim 1 or 2, wherein, to perform the switching operation, the entity (OP) external to said device transmits a command (COM) remotely to said device (CARD) in order to switch from the first authentication algorithm (Algo1) to the second authentication algorithm (Algo2).

4. Method according to claim 1 or 2, wherein, to perform the switching operation, the entity external to said device downloads into the device a program which can start up after a time delay and whose purpose is to switch from the first authentication algorithm (Algo1) to the second authentication algorithm (Algo2).

5. Method according to claim 1, wherein, during the pre-storage step, a second code IMS12, different from a code IMSI1 associated with the first algorithm, and associated with the algorithm Algo2, is stored, and wherein after the step for switching accounts on said device (CARD), said device (CARD) transmits the code IMS12 to all or some of the data processing devices (SERV) whose algorithms need to be switched, said second code (IMSI2) associated with the second algorithm informing these data processing devices that the algorithms have been switched in order to synchronise the algorithm update.

6. Method according to claim 5, wherein on reception of the second code (IMSI2) associated with the second authentication algorithm (Algo2), said receiving device switches algorithm from the first authentication algorithm (Algo1) to the second authentication algorithm (Algo2).

7. Method according to claim 1, wherein after switching, the memory space storing the data associated with the deactivated account is reused.

8. The method of updating an authentication algorithm used by a device (CARD) to authenticate with a data processing device (SERV) of claim 1, wherein at least one of the first preliminary step and the second preliminary step is performed during card personalization.

9. Data processing device, in particular a smart card having a memory element for storing a subscriber identity (IMSI) and associated with an authentication algorithm (Algo), comprising:

first non-volatile memory means storing an active first authentication algorithm (Algo1) associated with a first subscriber identity (IMSI1), second non-volatile memory means storing an inactive second authentication algorithm (Algo2) associated with a second subscriber identity (IMSI2), a microcontroller programmed to carry out a step for switching from the first authentication algorithm (Algo1) to the second authentication algorithm (Algo2), which when executed permanently deactivates the first authentication algorithm (Algo1) and activates the second authentication algorithm (Algo2).

10. A non-volatile computer storage media operable to store instructions for instructing a data processing device, in particular a smart card, to perform certain operations, the storage media comprising:

an active first authentication algorithm (Algo1) associated with a first subscriber identity (IMSI1) stored in the non-volatile storage media during a preliminary phase;

an inactive second inactive authentication algorithm (Algo2) associated with a second subscriber identity (IMS12) stored in the non-volatile storage media during a preliminary phase; and instructions to direct the data processing device (CARD) to execute a step for switching from the first authentication algorithm (Algo1) to the second authentication algorithm (Algo2), which when executed inhibits the first authentication algorithm (Algo1) associated with a first subscriber identity (IMSI 1) and activates the second authentication algorithm.

11. The storage media according to claim 10, further comprising instructions to direct the data processing device to perform the step of switching from the first authentication algorithm to the second authentication algorithm, upon receiving from a transmitting device a code IMSI2 different from the code IMSI1 and therefore associated with the second authentication algorithm Algo2.

12. The computer storage media of claim 10, wherein at least one of the first and second authentication algorithms is stored in the storage media during card personalization.

* * * * *